United States Patent [19]

Ehara

[11] Patent Number: 5,706,393
[45] Date of Patent: Jan. 6, 1998

[54] AUDIO SIGNAL TRANSMISSION APPARATUS THAT REMOVES INPUT DELAYED USING TIME TIME AXIS COMPRESSION

[75] Inventor: Hiroyuki Ehara, Yokohama, Japan

[73] Assignee: Matsushita Electric Industrial Co., Ltd., Osaka, Japan

[21] Appl. No.: 415,618

[22] Filed: Apr. 3, 1995

[30] Foreign Application Priority Data

Apr. 8, 1994 [JP] Japan .................. 6-070993

[51] Int. Cl.$^6$ .................................................. G10L 3/00
[52] U.S. Cl. .................. 395/2.24; 395/2.1; 395/2.35; 395/2.42; 395/2.57
[58] Field of Search .................. 395/2.1, 2.24, 395/2.33, 2.35, 2.36, 2.37, 2.42, 2.57, 2.62, 2.76, 2.28

[56] References Cited

U.S. PATENT DOCUMENTS

| | | | |
|---|---|---|---|
| 3,909,532 | 9/1975 | Rabiner et al. | 395/2.24 |
| 4,110,560 | 8/1978 | Leary et al. | 395/2.24 |
| 4,130,739 | 12/1978 | Patten . | |
| 4,286,116 | 8/1981 | Sadou | 395/2.35 |
| 4,860,359 | 8/1989 | Eicher . | |
| 5,157,728 | 10/1992 | Schorman et al. | 381/33 |
| 5,230,089 | 7/1993 | Kindinger et al. . | |

FOREIGN PATENT DOCUMENTS

| | | |
|---|---|---|
| 0544101A1 | 6/1993 | European Pat. Off. . |
| 92/06467 | 4/1992 | WIPO . |

OTHER PUBLICATIONS

Patent Abstracts of Japan, vol. 013, No. 304 (E-786), 12 Jul. 1989 & JP-A-o1 081460 (NEC CORP) 27 Mar. 1989.

*Primary Examiner*—Allen R. MacDonald
*Assistant Examiner*—Alphonso A. Collins
*Attorney, Agent, or Firm*—Watson Cole Stevens Davis, P.L.L.C.

[57] ABSTRACT

An audio signal transmission apparatus for use in a system for judging whether voice or sound is present or not to transmit only the voice presence portion of a digital audio signal which apparatus transmits data inputted earlier than the judgment time of the voice presence to thereby prevent the head of a word from being lost and dissolves the delay time caused at this time by compressing the time axis. The apparatus includes a delay circuit for storing a past audio signal data train, a time axis compression unit for compressing an audio signal taken out from the delay circuit through a switch and an audio signal inputted through a switch on a time axis, a level judgment unit for judging whether the audio signal is present or not to operate the switches, and a data conversion unit for converting the digital audio signal into parameters to be transmitted. An audio signal data train inputted earlier than the judgment time of the voice presence can be transmitted without occurrence of a delay time to thereby prevent the head of a word starting from a frictional or explosive consonant sound from being lost.

4 Claims, 4 Drawing Sheets

AUDIO SIGNAL TRANSMISSION APPARATUS THAT REMOVES INPUT DELAYED USING TIME TIME AXIS COMPRESSION

BACKGROUND OF THE INVENTION

1. Field of the Invention

The present invention relates to an audio signal transmission apparatus for use in a system for judging whether voice or sound is present or not to transmit only the voice presence portion.

2. Description of the Related Art

Recently, the audio signal coding with a low bit rate is required due to an increased demand for the digital mobile communication and various audio signal coding methods have been proposed. A variable rate audio signal coding method has been proposed as one of them in which an amount of information to be transmitted is reduced in a silence section and necessary information is transmitted in only a voice presence section to thereby reduce an average transmission bit rate. Further, in the mobile telephone system, it is preferred that information is not transmitted during the silence section due to reduction of power consumption. Such a system in which information is transmitted with a different bit rate depending on the voice presence section and the silence section is required to judge whether voice is present or not, that is, a level of an audio signal. However, there is a case where the judgment is not made exactly upon the presence of background noise or upon rising of a consonant sound and therefore the head of a word starting from a frictional or explosive consonant sound is missing.

A conventional audio signal transmission apparatus using level judgment means is now described.

FIG. 4 is a schematic diagram illustrating a conventional audio signal transmission apparatus. As shown in FIG. 4, an input digital audio signal is supplied to level judgment means 1 to judge whether the audio signal contains voice or not. When the audio signal contains voice, a switch 2 is closed and the digital audio signal is supplied through the switch to data conversion means 3 to be converted into a transmission parameter.

In the conventional audio signal transmission apparatus, however, there is a problem that judgment is often not made exactly in the head of a word starting from a frictional or explosive consonant sound upon rising of a consonant sound when there is background noise or the like and at this time the head of the word is missing.

SUMMARY OF THE INVENTION

The present invention is to solve the above problems in the prior art and an object of the present invention is to provide an audio signal transmission apparatus in which when level judgment means judges that a voice or audio signal is present, an audio signal inputted earlier than the judgment time is taken out to prevent the head of a word from being lost. Further, it is another object of the present invention to provide an audio signal transmission apparatus in which a time delay caused at this time can be dissolved by compressing a time axis of the signal.

An audio signal transmission apparatus according to a first aspect of the present invention comprises an input terminal for receiving a digital audio signal having data frames, level judgment means, connected to the input terminal for detecting an audio signal level represented by the received digital audio signal to generate a control signal for a predetermined period when the detected audio signal level is larger than a predetermined level, delay means, connected to the input terminal, for delaying the received digital audio signal, and data conversion means for converting the digital audio signal delayed by the delay means into a parameter to be transmitted when the control signal is present.

Further, an audio signal transmission apparatus according to a second aspect of the present invention comprises an input terminal for receiving a digital audio signal having data frames, level judgement means connected to the input terminal, for detecting an audio signal level represented by the received digital audio signal for each of said data frames to generate a first control signal for a first predetermined period when the detected audio signal level is changed from a level smaller than a predetermined level to a level larger than the predetermined level and generate a second control signal for a second predetermined period when the detected audio signal level is larger than the predetermined level, delay means connected to the input terminal for delaying the received digital audio signal, time axis compression means for compressing the digital audio signal delayed by the delay means and the received digital audio signal on a time axis to produce the compressed digital audio signal at least when the first control signal is present, and data conversion means for converting the compressed digital audio signal into a parameter to be transmitted when the first control signal is present and converting the received digital audio signal into parameters to be transmitted when the first control signal is absent and the second control signal is present.

With the above configuration, the received digital audio signal is delayed by a predetermined time by the delay means. The digital audio signal delayed by the predetermined time can be taken out when the level judgment means generates the judgment of the voice presence by using an undelayed input digital audio signal, so that an audio signal data train inputted earlier than the judgment time of the voice presence can be obtained to prevent the head of a word from being lost upon the judgment of the voice presence. Although the audio signal data train thus obtained is delayed by use of the delay means, the time delay caused by the delay means can be dissolved when the time axis is compressed by use of the time axis compression means.

DESCRIPTION OF THE PREFERRED EMBODIMENTS

Figure 1:
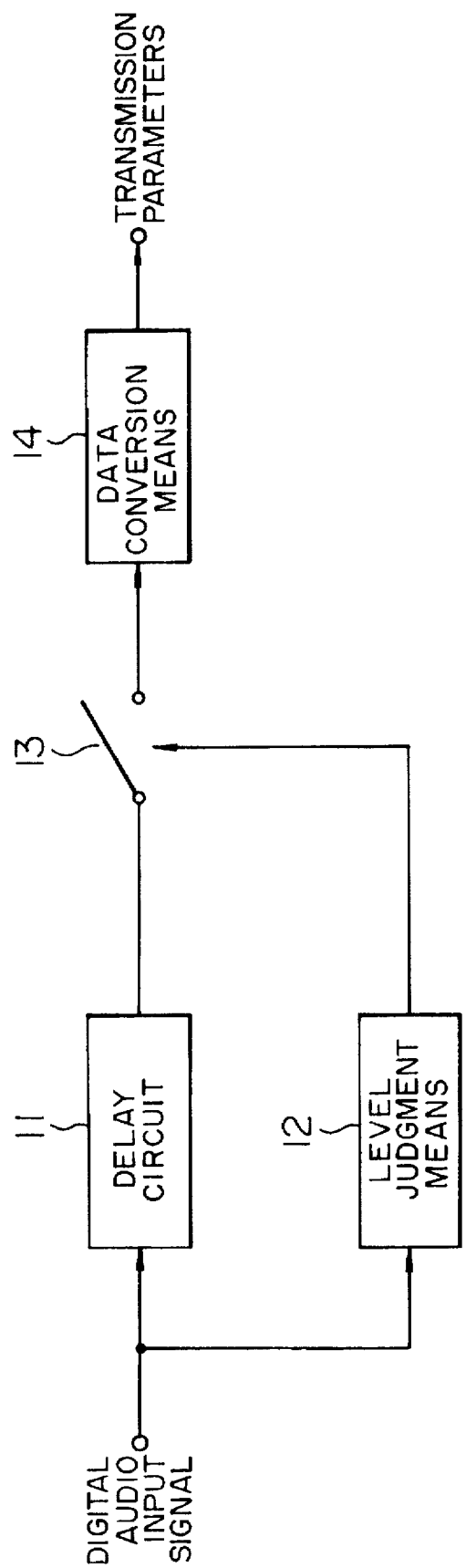
FIG. 1 is a block diagram illustrating an audio signal transmission apparatus according to a first embodiment of the present invention.

A first embodiment of the present invention is now described with reference to FIG. 1. In the embodiment, a digital audio signal is processed for each frame having a predetermined time length. In FIG. 1, numeral 11 denotes a delay circuit for delaying an input digital audio signal to supply the delayed signal through a switch 13 to data conversion means 14. Numeral 12 denotes level judgment means for comparing a level of the audio signal in each input frame with a predetermined level to judge whether the voice or sound is present or not, that is, whether the audio signal is in a voice presence state or a silence state so that a control signal is supplied to the switch 13. Numeral 13 denotes a switch which performs switching in accordance with the control signal supplied from the level judgment means 12, and numeral 14 denotes data conversion means for converting the delayed audio signal supplied from the delay circuit 11 through the switch 13 into transmission parameters to output it. The delay time of the delay circuit 11 is equal to or longer than a period corresponding to one frame and particularly one frame period is suitable for the delay time. In the following description, the delay time is assumed to be one frame period.

Operation of the audio signal transmission apparatus configured above is now described with reference to FIG. 1. In FIG. 1, the digital audio signal of each frame is supplied to the delay circuit 11 and the level judgment means 12. The digital audio signal of one frame received by the delay circuit 11 is supplied to the switch 13 after one frame. The digital audio signal of each frame inputted to the level judgment means 12 is used for judgment as to whether the frame is a voice presence frame or a silence frame. When it is judged that the frame is the voice presence frame, the level judgment means 12 generates the control signal for the frame period and a predetermined period subsequent thereto. The predetermined period is desirably not longer than one frame period. The one-frame-delayed digital audio signal produced by the delay circuit 11 is supplied to the switch 13. The switch 13 receives the control signal produced by the level judgment means 12 to be turned on and off. When the control signal is supplied to the switch, the switch 13 is turned on so that the one-frame-delayed digital audio signal produced by the delay circuit 11 is supplied to the data conversion means 14 through the switch 13. Further, since the control signal is present for the predetermined period after the judgment of the level judgment means 12 has been changed from the voice presence to the silence, the switch 13 remains on and the one-frame-delayed digital audio signal produced by the delay circuit 11 is supplied through the switch 13 to the data conversion means 14. The one-frame-delayed digital audio signal supplied to the data conversion means 14 through the switch 13 from the delay circuit 11 is converted into the transmission parameters by the data conversion means 14 and is outputted. On the other hand, when the judgment of the level judgment means 12 is the silence except the predetermined period, the control signal is not present and accordingly the switch 13 is off. Thus, the one-frame-delayed digital audio signal produced by the delay circuit 11 is not supplied anywhere. Further, when the switch 13 becomes off, an input to the data conversion means 14 is not present, so that the data conversion means 14 stops outputting the transmission parameters.

Operation of the switch 13 is as follows.

(1) When the judgment of the level judgment means 12 is the voice presence:

The switch 13 is turned on and the one-frame-delayed digital audio signal produced by the delay circuit 11 is supplied to the data conversion means 14 through the switch 13. The data conversion means 14 converts the one-frame-delayed digital audio signal supplied through the switch 13 from the delay circuit 11 into the transmission parameters to be outputted.

(2) During the predetermined period after the judgment of the level judgment means 12 has been changed from the voice presence to the silence:

Operation of the switch is quite identical with that in the case of the above item (1). Since the digital audio signal inputted before one frame is judged to be in the voice presence state, the one-frame-delayed digital audio signal produced from the delay circuit 11 has the voice presence frame. Accordingly, in order to prevent the ending of a word from being cut or lost, even when the judgment of the level judgment means 12 is the silence, the switch 13 remains on during the predetermined period after the judgment has been changed from the voice presence to the silence.

(3) When the judgment of the level judgment means 12 is the silence except the period defined by the above item (2):

The switch 13 is off. Since the switch 13 is off, the data conversion means 14 is not supplied with any signal and stops outputting the transmission parameters.

Figure 2:
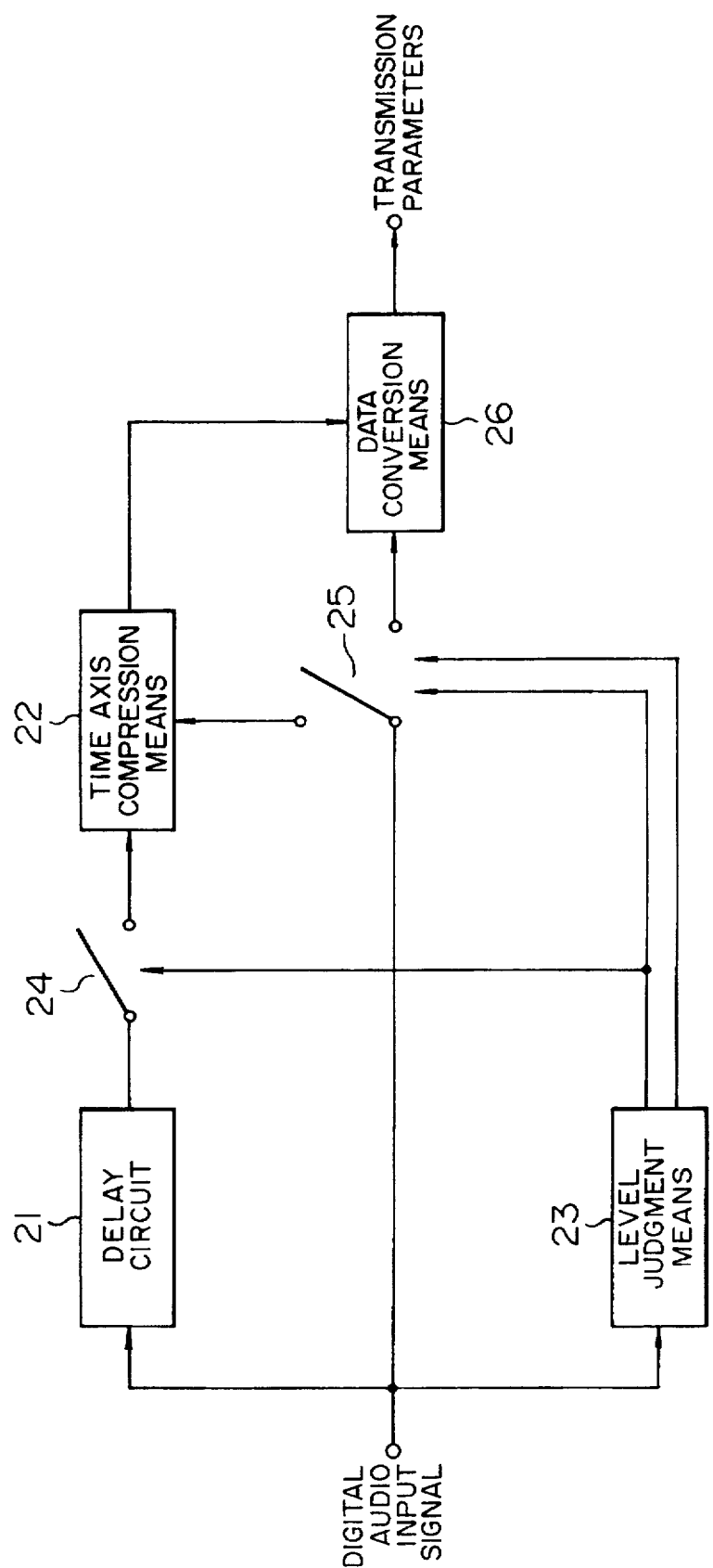
FIG. 2 is a block diagram illustrating an audio signal transmission apparatus according to a second embodiment of the present invention.

A second embodiment of the present invention is now described with reference to FIG. 2. In this embodiment, the digital audio signal is also processed for each frame having a predetermined time length. In FIG. 2, numeral 21 denotes a delay circuit for delaying an input audio signal to supply the delayed audio signal to time axis compression means 22 through a switch 24. Numeral 22 denotes time axis compression means for performing compression of a time axis by using the delayed audio signal inputted through the switch 24 and the undelayed audio signal inputted through a switch 25 and supplying the audio signal after compression of the time axis to data conversion means 26 in each frame. Numeral 23 denotes level judgment means for comparing a level of the input audio signal of each frame with a predetermined level to judge whether the voice or sound is present or not, that is, whether the audio signal is in a voice presence state or a silence state so that first control signal is supplied to switches 24 and 25, second control signal is supplied to switch 25. Numeral 24 denotes a switch for performing switching in accordance with the first control signal inputted from the level judgment means 23, numeral 25 denotes a switch for performing switching in accordance with the first and second control signals inputted from the level judgment means 23. Numeral 26 denotes data conversion means for performing data conversion processing of the audio signal of each frame inputted through the switch 25 or the time-axis-compressed audio signal of each frame supplied from the time axis compression means 22 and producing a result thereof as a transmission parameters. A delay time of the delay circuit 21 is equal to or longer than a period corresponding to one frame and particularly one frame period is suitable for the delay time. In the following description, the delay time is assumed to be one frame period.

Operation of the voice signal transmission apparatus configured above is now described with reference to FIG. 2. In FIG. 2, the audio signal of one frame is supplied to the delay circuit 21, the level judgment means 23 and the switch 25. The audio signal supplied to the delay circuit 21 is supplied to the switch 24 after one frame. The audio signal supplied to the level judgment means 23 is used to judge whether the frame is the voice presence frame or the silence frame. When the judgment of the level judgment means 23 is changed from the silence to the voice presence and during a predetermined number of frames after the judgment has been changed, the first control signal is generated and the audio signal of one frame inputted to the switch 25 is supplied to the time axis compression means 22. When the judgment is the voice presence after the elapse of the predetermined number of frames, the audio signal of one frame inputted to the switch 25 is supplied to the data conversion means 26. When the judgment of the level judgment means 23 is the voice presence, the second control signal is generated for a period longer than one frame period and when the judgment of the level judgment means 23 is the silence, the switch 25 is turned off after that period and the audio signal of one frame inputted to the switch 25 is not supplied anywhere. When the judgment of the level judgment means 23 is changed from the silence to the voice presence and during the predetermined number of frames after the judgment has been changed, the first control signal is generated and the audio signal before one frame inputted to the switch 24 is supplied to the time axis compression means 22. During the other time except the above-mentioned time, the switch 24 is off and the one-frame-delayed audio signal of one frame inputted to the switch 24 is not supplied anywhere. Operation of the switches 24 and 25, the time axis compression means 22 and the data conversion means 26 is as follows.

(1) Period of time after the judgment of the level judgment means 23 has been changed from the silence to the voice presence until the delay time is dissolved by the compression of the time axis:

The switch 24 is on and is connected to the time axis compression means 22, so that the audio signal inputted before one frame is supplied to the time axis compression means 22. Further, the switch 25 is connected to the side of the time axis compression means 22 and the undelayed input audio signal is supplied to the time axis compression means 22. The time axis compression means 22 performs the compression of the time axis by using the audio signal before one frame inputted through the switch 24 and the undelayed (current) audio signal inputted through the switch 25 and supplies the compressed audio signal to the data conversion means 26 in each frame. The data conversion means 26 produces the transmission parameters from the audio signal supplied from the time axis compression means 22 and outputs them.

(2) When the judgment of the level judgment means 23 is the voice presence after the above item (1):

The switch 24 is off and the switch 25 is connected to the side of the data conversion means 26. Since the switch 24 is off, no signal is inputted to the time axis compression means 22 and no signal is supplied to the data conversion means 26 from the time axis compression means 22. The data conversion means 26 produces the transmission parameters from the undelayed (current) audio signal inputted through the switch 25 and outputs it.

(3) When the judgment of the level judgment means 25 is the silence:

The switches 24 and 25 are both off. Accordingly, there is no input signal to the time axis compression means 22 and no input signal supplied to the data conversion means 26 from the time axis compression means 22. Further, since the switch 25 is off, no signal is supplied to the data conversion means 26 through the switch 25 and the data conversion means 26 stops outputting the transmission parameters.

Figure 3:
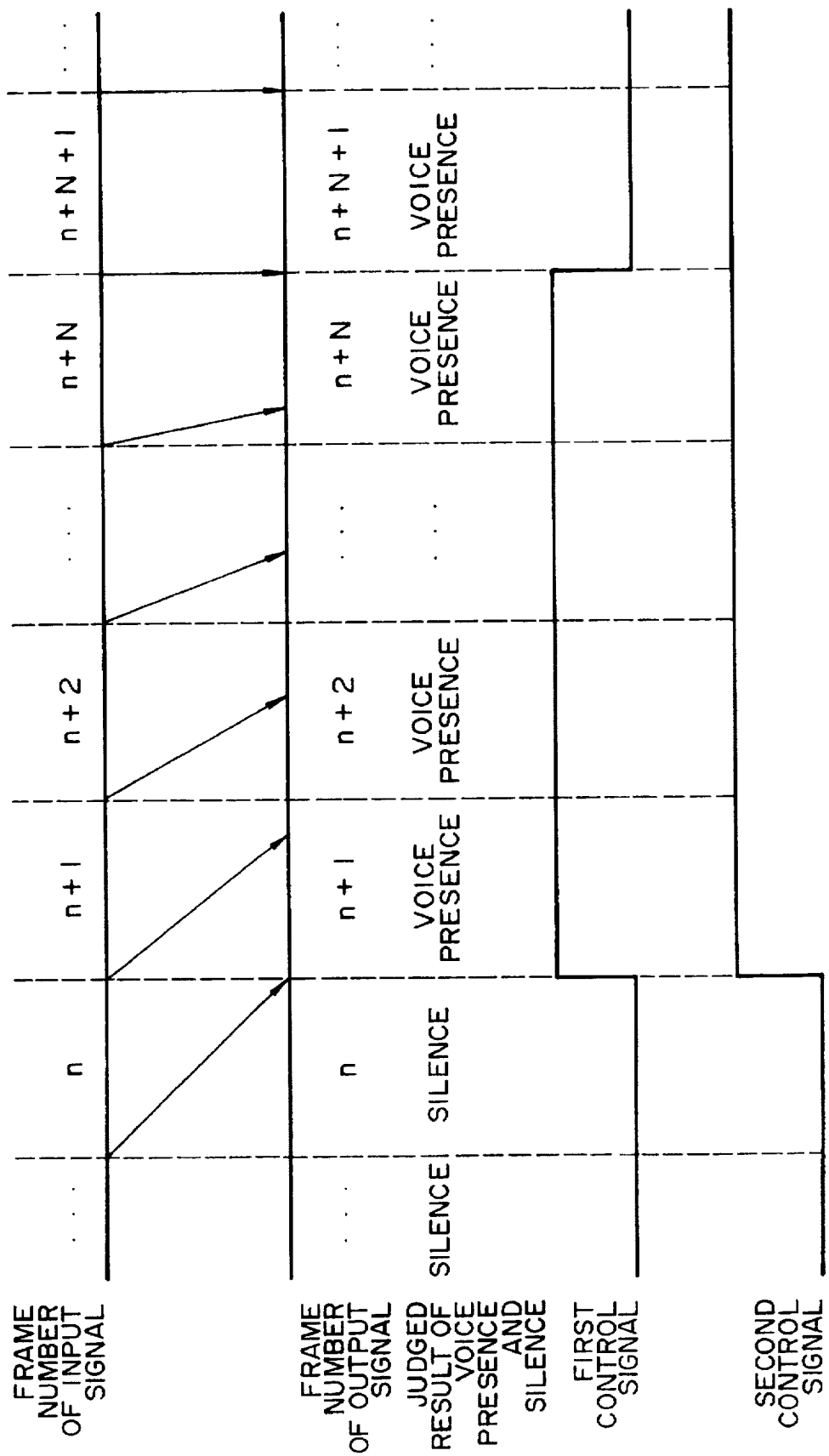
FIG. 3 is a timing chart showing the time relation of an input digital audio signal before compression of a time axis, an output digital audio signal after compression of the time axis, and judgment results as to whether voice is present or not.
Figure 4:
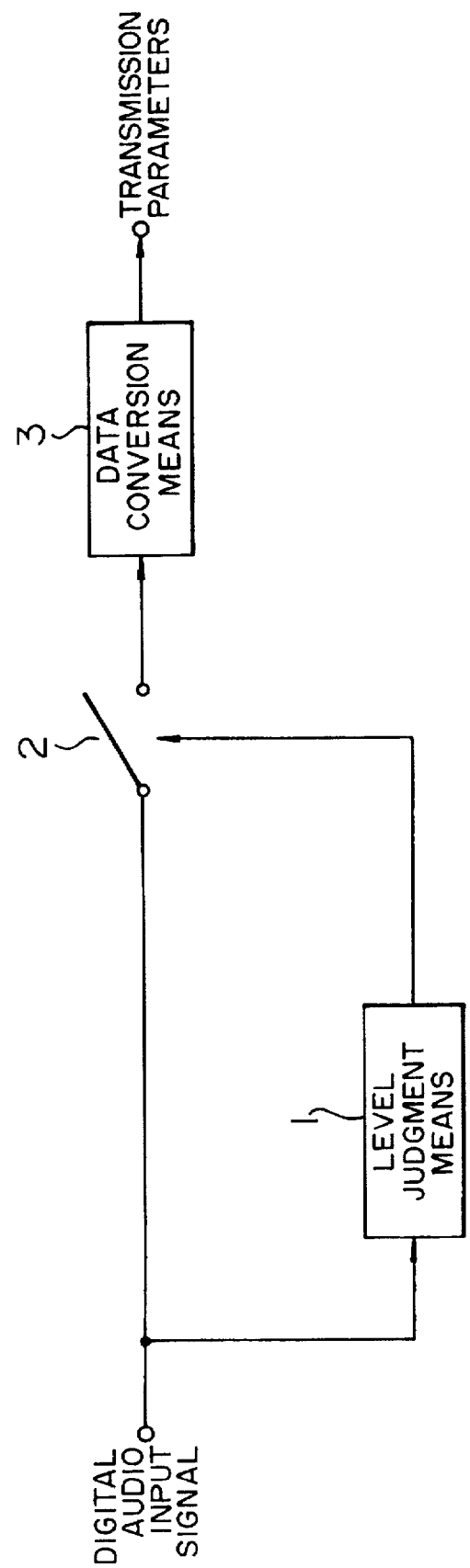
FIG. 4 is a block diagram illustrating a conventional audio signal transmission apparatus.

FIG. 3 shows a time relation of the audio output signal produced from the time axis compression means 22, the audio input signal (with no compression of the time axis) at this time, the judgment of the level judgment means 23 and the first and second control signals. In FIG. 3, . . . . . n, n+1, n+2, . . . , n+N, . . . represent the frame numbers when the audio signal is processed with a frame unit. N represents the number of frames required to dissolve the delay caused by the delay circuit by using the compression of the time axis (N is equal to or larger than 2) and is determined by a compression rate and a frame length (delay time). As shown in FIG. 3, the audio output signal of the n+1st frame is obtained by compressing the time axis by using the audio input signal of the n-th frame and the audio input signal of the n+1st frame and the audio output signal of the n+2nd frame is obtained by compressing the time axis by using the audio input signal of the n+1st frame and the audio input signal of the n+2nd frame. Similarly, the audio output signal of the (n+i)th frame is obtained by compressing the time axis by using the audio input signal of the (n+i−1)th frame and the audio input signal of the (n+i)th frame. The delay time caused by the delay circuit has been dissolved after the (n+N+1)th frame and accordingly the audio input signal becomes the audio output signal as it is.

As described above, by providing the delay circuit and the time axis compression means, the audio signal can be transmitted without missing the head of a word and occurrence of time delay (however, time delay due to frame processing occurs).

As described above, according to the present invention, in the system in which the received digital audio signal is used to judge whether the voice or sound is present or not and data is transmitted during only the section in which it is judged that the audio signal is present, data inputted earlier than the time when it is judged that the audio signal is present can be transmitted to thereby prevent the head of a word from being lost and the delay time caused at this time can be compressed to be dissolved, so that the excellent audio signal transmission apparatus can be attained.

I claim:

1. An audio signal transmission apparatus comprising:

an input terminal for receiving a digital audio signal having data frames;

level judgment means, connected to said input terminal, for detecting an audio signal level represented by the received digital audio signal for each of said data frames to generate a first control signal for a predetermined period when the detected audio signal level is changed from a level smaller than a predetermined level to a level larger than said predetermined level and to generate a second control signal when the detected audio signal level is larger than said predetermined level;

delay means, connected to said input terminal, for delaying the received digital audio signal;

time axis compression means for compressing the digital audio signal delayed by said delay means on a time axis at a constant rate to produce the compressed digital audio signal while said first control signal is present; and data conversion means for converting the compressed digital audio signal into parameters to be transmitted when said first control signal is present and converting the received digital audio signal into parameters to be transmitted when said first control signal is absent and said second control signal is present.

2. The audio signal transmission apparatus according to claim 1, wherein said predetermined period is substantially equal to an integral multiple of a period corresponding to one data frame of said digital audio signal.

3. The audio signal transmission apparatus according to claim 1, wherein a delay time of said delay means is substantially equal to a period corresponding to one data frame of said digital audio signal.

4. The audio signal transmission apparatus according to claim 3, wherein:

said predetermined period is substantially equal to a period corresponding to N data frames of said digital audio signal where N is an integer larger than 1; and said time axis compression means compresses the digital audio signal delayed by said delay means on a time axis at a constant rate of $k=N/(N+1)$ while said first control signal is present.

* * * * *